United States Patent [19]
Fellers et al.

[11] 3,750,012
[45] July 31, 1973

[54] FAULT LOCATING SYSTEM FOR WAVEGUIDE TRANSMISSION LINE UTILIZING SPACED REFLECTORS

[75] Inventors: Rufus Gustavus Fellers, Columbia, S.C.; Larry Wardell, Hinderks, Plainfield, N.J.

[73] Assignee: Bell Telephone Laboratories, Incorporated, Murray Hill, Berkley Heights, N.J.

[21] Appl. No.: 215,566

[52] U.S. Cl. ............. 324/52, 324/58 B, 324/58.5 B
[51] Int. Cl. .............................................. G01r 31/11
[58] Field of Search ................ 324/52, 58 B, 58.5 B

[56] References Cited
UNITED STATES PATENTS

| | | | |
|---|---|---|---|
| 3,691,519 | 9/1972 | Wolf | 324/52 X |
| 3,244,978 | 4/1966 | Craven et al. | 324/58 B |
| 3,418,207 | 12/1968 | Becker et al. | 324/52 X |

OTHER PUBLICATIONS

Reich et al., "Microwave Theory and Techniques," N.Y., D. Van Nostrand Company Inc., 1953, pp. 335–381. TK 7870 R4 C.3.

*Primary Examiner*—Gerard R. Strecker
*Attorney*—W. L. Keefauver

[57] ABSTRACT

Faults having negligible reflectivity but causing substantial signal loss in an overmoded waveguide transmission line can be located by utilizing reflectors spaced at substantially equal intervals along the line. Return loss from these reflectors is measured and faults localized between any two of such reflectors by detecting any departure of the return loss from a linear increase with distance.

6 Claims, 4 Drawing Figures

FAULT LOCATING SYSTEM FOR WAVEGUIDE TRANSMISSION LINE UTILIZING SPACED REFLECTORS

BACKGROUND OF THE INVENTION

1. Field of the Invention

This invention relates to waveguide transmission systems and more particularly to a system for locating faults in an overmoded waveguide transmission line which produce substantial signal loss but have negligible reflectivity.

2. Description of the Prior Art

Many types of faults such as deformations in an overmoded waveguide or certain types of contaminants therein cause substantial loss to a signal being transmitted in the waveguide but do not reflect any significant portion of such signal. Such faults can occur before, during or after the installation of the waveguide but must be located and corrected in either case if the waveguide is to function properly.

Numerous systems are presently available for fault location in coaxial cables and the like which comprise dominant mode transmission lines. Some of these systems utilize the reflections of test signals from the fault itself to locate the fault and determine the magnitude thereof. However, since many loss producing faults in an overmoded waveguide do not reflect any appreciable amount of energy, these present fault locating systems are not satisfactory for use in such an overmoded waveguide system.

Accordingly, it is an object of this invention to improve fault locating equipment so that loss producing faults having no appreciable reflectivity can be located.

Another object is to make the effectiveness of fault locating systems independent of the characteristics of the specific fault involved.

SUMMARY OF THE INVENTION

The foregoing objects and others are achieved in accordance with this invention by the utilization of low loss reflectors such as thin dielectric diaphragms or tuned circumferential resonators placed at substantially equal intervals along the overmoded waveguide. A test signal, to which the reflectors respond, is transmitted along the waveguide and the return loss of the reflected energy is measured. In the absence of any loss producing faults in the waveguide, the return loss increases linearly from one reflector to another. Any departure from linearity indicates a fault located between the two reflectors which define the departure from linearity.

DETAILED DESCRIPTION

Figure 1:
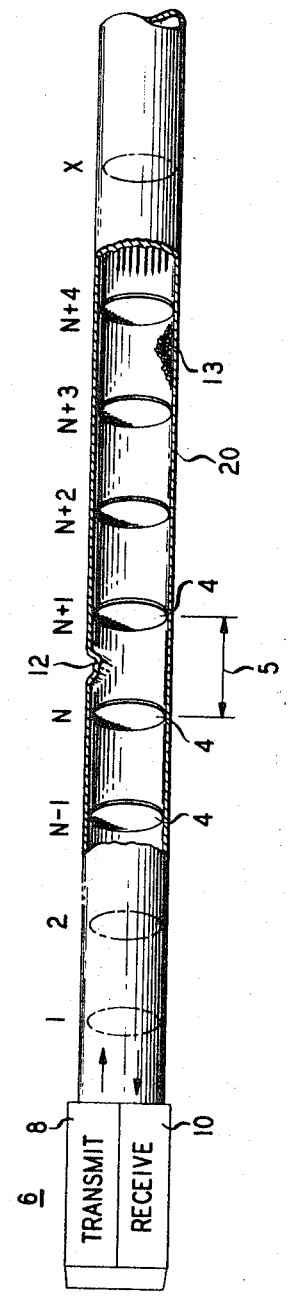
FIG. 1 is a schematic representation of a fault locating system in accordance with the invention.

Referring now to FIG. 1 there is shown a system for locating faults in an overmoded waveguide 20 in accordance with this invention. At substantially equal intervals or spacings 5 along waveguide 20 are located relatively low loss reflectors 4. Reflectors 4 advantageously have substantially identical coefficients of reflection, i.e., reflect substantially identical percentages of the signal energy incident thereon and transmit the remainder with relatively low loss. The coefficients of reflection will normally be less than 0.05.

A test set 6 including both a transmit unit 8 and a receive unit 10 is connected to the end of waveguide 20. Transmit unit 8 includes signal generating apparatus known in the art for generating a test signal which is optimized for the particular reflectors 4 being used. The test signals can be a single pulse or train of narrow pulses. The test signals are propagated into waveguide 20 by transmit unit 8. As the test signals encounter each reflector 4, a portion of the energy thereof, determined by the coefficient of reflection, is reflected by reflector 4 back to test set 6 and the remainder of the energy is transmitted forward to subsequently encounter other reflectors 4. The pulses should have a width less than $2L/v$, where L is the spacing 5 of reflectors 4 and $v$ is the group velocity of the test signals, in order to associate the reflected signal with a particular reflector 4.

The energy reflected by each reflector 4 back along waveguide 20 is detected and the return loss, i.e., the total or round trip transmission loss, is measured by receive unit 10 in test set 6. Receive unit 10 advantageously comprises a reflectometer known in the art as having a very low signal measuring capability which is necessary because of the high return loss of the reflected signals at long distances.

In the absence of discrete loss producing faults along waveguide 20 the return loss of the reflected signals will increase linearly, i.e., at a constant rate, between all successive reflectors 4. For example, as illustrated in FIG. 1, no faults are indicated in the waveguide before reflector number N. Thus, as indicated in plot 30 in FIG. 4, the return loss for all reflectors up to reflector N increases along a straight line. If discrete loss producing faults are present in the waveguide, the return loss between the reflectors 4 adjacent these faults will deviate from the constant rate or linear increase exhibited between other reflectors. For example, a discrete fault 12 which may be a deformation in waveguide 20 is located between reflector number N and reflector number $(N+1)$. Thus the rate of increase of return loss exhibited by the signals reflected from reflectors number N and $(N+1)$ is greater than the rate of increase of return loss between preceeding or subsequent reflectors as shown in plot 30 of FIG. 4. This departure from linearity clearly locates the loss producing fault between reflectors number N and $(N+1)$. Another fault 13, which might be a contaminant such as water, is located between reflectors number $(N+3)$ and $(N+4)$. Again the rate of increase of return loss between these two reflectors departs from the linear increase displayed between other reflectors having no such faults therebetween.

From the foregoing, it is apparent that loss producing faults can be localized between any two reflectors 4. The actual distance or degree of localization depends upon the spacings 5 of reflectors 4. Such factors as expected frequency of failures, cost of installing reflectors 4 and signal loss introduced by the reflectors 4 must be considered to arrive at the optimum reflector spacing 5 for any given waveguide line.

Figure 2:
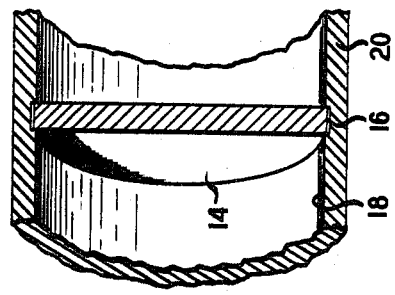
FIG. 2 is a representation of a thin dielectric window which can be utilized as the reflector in FIG. 1.

In one embodiment reflectors 4 can comprise thin dielectric diaphragms 14 of plastic film or the like as illustrated in FIG. 2. Such diaphragms 14 can be clamped between the flanges of couplings used to join the waveguide sections. Alternatively, the diaphragms can be mounted by bonding or the like in shallow grooves 16 around the interior periphery 18 of waveguide 20 as illustrated in FIG. 2. The use of diaphragms 14 for reflectors 4 is particularly advantageous where it is desired to compartmentalize or sectionalize the waveguide line. The diaphragms 14 can be designed to form seals with the interior 18 of waveguide 20 so that a failure in the line resulting in ingress of water or other contaminants will be restricted between two reflectors 4. Of course, the use of such diaphragms 14 to sectionalize waveguide 20 will prevent the use of a single continuous purging system of low loss gas within waveguide 20 unless means for bypassing the diaphragms 14 are also provided.

In another embodiment reflectors 4 comprise circumferential resonators 22 around the inner periphery 18 of waveguide 20 which are tuned to respond through coupling slot 27 to test signals within a particular frequency band. Such resonators are particularly advantageous when it is desired to establish a specific narrow band of frequencies within the entire transmission band as test frequencies. Such test frequencies can then be utilized without interference with normal communication signals. For example, in the frequency band of 40 to 110 GHz which may be utilized in a waveguide transmission system, contaminants such as oxygen have the most degrading effect on transmission at frequencies near 60 GHz. Thus a narrow band of test frequencies around 60 GHz could be utilized to locate such contaminants in a waveguide line before other portions of the communication spectrum are seriously degraded. The depth 24, width 26 and coupling slot 27 of resonators 22 can be varied by techniques known in the art to make resonators 22 responsive to the desired frequency.

The fault locating system has been described with respect to a waveguide line having a uniform or constant transmission loss between all reflectors 4 and further with respect to reflectors 4 having identical spacings and coefficients of reflection. However, the system can be utilized under much less ideal conditions. For example, if waveguide 20 exhibits a nonuniform transmission loss, a plot of return loss against distance or reflector number would not be linear even for these reflectors not having faults therebetween but instead would appear as plot 32 in FIG. 4. In such case, the characteristics, i.e., the transmission attenuation, of waveguide 20 could be determined between each of the reflectors upon the initial installation of waveguide 20. Thereafter faults could be located by observing deviations from this previously measured rate of transmission loss, i.e., detecting changes in the slope of plot 32 between specific reflectors as compared with the initially measured slope. Under such conditions the plot of return loss against distance does not make the location of faults quite as visually apparent as under the uniform transmission loss conditions. However, the changes in slope from the initially measured values can be readily detected through the use of the reflectometer as previously mentioned. Similar accommodations with respect to variations in the reflectivity and spacings of reflectors 4 can be made by initial measurement of the parameters of concern.

Figure 4:
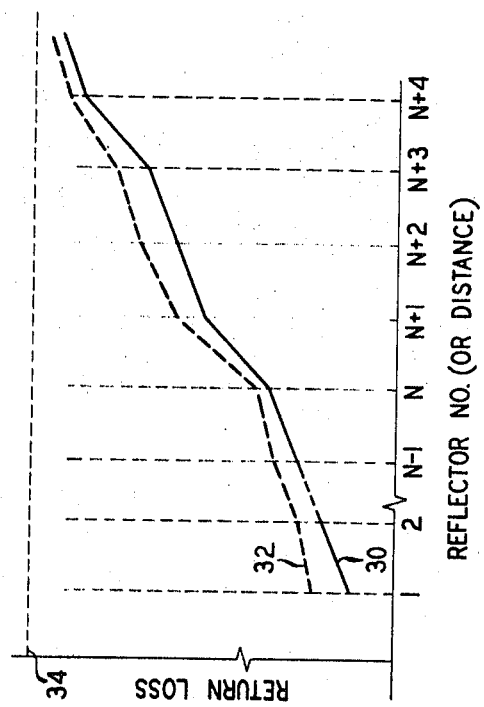
FIG. 4 is schematic representations of plots of return loss measured by the system of FIG. 1.
Figure 3:
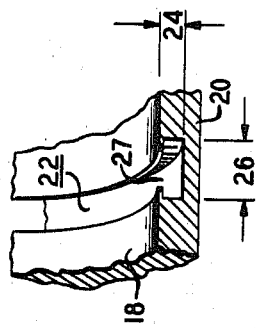
FIG. 3 is a representation of a tuned circumferential resonator which can be utilized as the reflector in FIG. 1.

Although the system has been described with respect to locating faults in existing systems, it also can be used in monitoring the installation of waveguide. For example, test signals could be transmitted along the waveguide line as additional sections of waveguide containing reflectors are being added to the line. The return loss from the test signals would be observed to indicate any significant deviation from the expected increase which would indicate faults that could be immediately corrected. Additionally, the rate of increase of return loss, together with the absolute value of return loss at a specific point, could indicate whether the maximum acceptable loss 34 as indicated in FIG. 4 will be exceeded within a prescribed distance if the rate of return loss should continue at the same level.

While the invention has been described with respect to specific embodiments thereof, it is to be understood that various modifications might be made thereto without departing from the spirit and scope of the following claims.

What is claimed is:

1. Apparatus for locating faults having negligible reflectivity in an overmoded waveguide transmission line comprising, in combination:
    means for transmitting a signal in a test mode through said waveguide line, said signal being subject to substantially uniform transmission loss along said waveguide line in the absence of said faults within said line;
    a plurality of low loss reflectors responsive to said signal in said test mode, but unresponsive to other mode signals, to reflect substantially equal portions thereof located at substantially equal intervals along said waveguide line so that said transmission loss of successive ones of said portions increases by a uniform amount in said absence of said faults; and
    means for measuring said transmission loss of said successive ones of said portions to detect deviations from said uniform amount whereby said faults can be located.

2. Apparatus in accordance with claim 1 wherein said reflectors comprise diaphragms of dielectric material mounted within said waveguide transmission line.

3. Apparatus in accordance with claim 2 wherein said diaphragms form gas tight seals around the inner periphery of said waveguide line thereby dividing said line into compartments defined by said diaphragms so that the ingress of contaminants into said waveguide line caused by one of said faults can be restricted to one of said compartments.

4. Apparatus in accordance with claim 1 wherein said reflectors comprise circumferential resonators around the inner periphery of said waveguide line.

5. Apparatus in accordance with claim 4 wherein said waveguide line can transmit a relatively broad band of frequencies, said test signal comprising a relatively narrow band of frequencies within said broad band, said resonators being adapted to have substantial response to said narrow band of frequencies and negligible response to the remainder of said broad band of frequencies.

6. Apparatus for locating faults having negligible reflectivity in an overmoded waveguide having known values of transmission attenuation along the length thereof, comprising, in combination:
means for transmitting a signal in a test mode through said waveguide;
low loss reflectors responsive to said signal in said test mode, but unresponsive to other mode signals, mounted along said waveguide for reflecting portions of said signal; and
means for measuring the transmission loss of said portions reflected so that deviations of said transmission loss of said portions reflected from said known values along said waveguide can be detected whereby said faults are indicated.

* * * * *

UNITED STATES PATENT OFFICE
CERTIFICATE OF CORRECTION

Patent No. 3,750,012                     Dated July 31, 1973

Inventor(s) Rufus Gustavus Fellers and Larry Wardell Hinderks

It is certified that error appears in the above-identified patent and that said Letters Patent are hereby corrected as shown below:

In the identifying heading at the top of the page following the drawings and preceding the text:

[75] Inventors:  change "Hinderks" in lightface print to

--Hinderks-- boldface print, delete the comma after Wardell.

before

[21]       "Appl. No. :215,566" insert the line

--Filed: January 5, 1972--.

Signed and sealed this 8th day of January 1974.

(SEAL)
Attest:

EDWARD M. FLETCHER, JR.                RENE D. TEGTMEYER
Attesting Officer                       Acting Commissioner of Patents